(12) United States Patent
Koyama

(10) Patent No.: US 6,958,793 B2
(45) Date of Patent: Oct. 25, 2005

(54) LIQUID CRYSTAL DISPLAY DEVICE

(75) Inventor: Hitoshi Koyama, Kumamoto (JP)

(73) Assignee: Advanced Display Inc., Kumamoto (JP)

( * ) Notice: Subject to any disclaimer, the term of this patent is extended or adjusted under 35 U.S.C. 154(b) by 126 days.

(21) Appl. No.: 10/743,998

(22) Filed: Dec. 24, 2003

(65) Prior Publication Data
US 2004/0135946 A1 Jul. 15, 2004

(30) Foreign Application Priority Data
Dec. 27, 2002 (JP) .......................... P2002-381391

(51) Int. Cl.[7] .......................................... G02F 1/1335
(52) U.S. Cl. ...................... 349/113; 349/110; 349/114; 349/119
(58) Field of Search ........................ 349/110, 111, 113, 349/114, 117, 119

(56) References Cited

U.S. PATENT DOCUMENTS 6,639,639 B2 * 10/2003 Baek et al. ................. 349/113

2003/0076464 A1 * 4/2003 Ozawa et al. ............... 349/113

FOREIGN PATENT DOCUMENTS

JP 2000-187220 7/2000

* cited by examiner

Primary Examiner—Dung T. Nguyen
Assistant Examiner—Tai Duong
(74) Attorney, Agent, or Firm—McDermott Will & Emery LLP

(57) ABSTRACT

In a transflective liquid crystal display device including a transmissive portion and a reflective portion in each pixel, the width of portions of a black matrix that are opposed to respective side portions of the transmissive portion is set greater than the width of portions of the black matrix that are opposed to respective side portions of the reflective portion. This measure prevents a phenomenon that leakage light coming from slant portions located on both sides of the transmissive portion or specular reflective light coming from flat portions would otherwise be mixed into reflective light from the reflective portion. As a result, highly legible, high-quality display without any glare can be realized. Contrast ratio evaluation results were such that the contrast ratio was 74 in the reflective mode and 194 in the transmissive mode. That is, high-contrast display was obtained in both of the reflective mode and the transmissive mode.

4 Claims, 4 Drawing Sheets

Prior Art

Prior Art

LIQUID CRYSTAL DISPLAY DEVICE

BACKGROUND OF THE INVENTION

1. Field of the Invention

The present invention relates to a liquid crystal display device and, particularly, to a transflective liquid crystal display device capable of display in both of a reflective mode and a transmissive mode.

2. Description of the Related Art

Having features of thinness, light weight, and low power consumption, liquid crystal display devices are widely used in portable information equipment such as cellular phones, PDAs (personal digital assistants), and electronic notes and other electronic equipment such as notebook-sized personal computers, monitors, and camcorders. Liquid crystal display devices that are non-emission-type devices and hence require an external light source are generally classified into a transmissive type and a reflective type by the type of the light source. In transmissive type liquid crystal display devices, a backlight having a light-emitting element(s) such as a cold-cathode tube, LEDs, or the like is used as an external light source and light emitted from the backlight is modulated according to a video signal in passing through a liquid crystal panel. In reflective-type liquid crystal display devices, light coming from such a light source as the sun is reflected by a reflector and light returning to a viewer is modulated by a liquid crystal panel according to a video signal.

However, conventionally, transmissive type devices have a problem that a displayed image is blurred in a bright environment and reflective-type devices have a problem that a displayed image becomes dark in a dark environment. To solve these problems, a transflective liquid crystal display device in which each pixel has a reflective portion and a transmissive portion has been proposed recently (JP-A-2000-187220 (page 5 and FIG. 1). In a bright environment, this transflective liquid crystal display device functions as a reflective-type liquid crystal display device and hence can reduce its power consumption. In a dark environment, it functions as a transmissive type liquid crystal display device and hence can provide a bright, high-quality image. As such, this transflective liquid crystal display device is now widely used in cellular phones.

FIG. 4 is a plan view showing one pixel of a common, conventional transflective liquid crystal display device. FIG. 5 is a sectional view taken along line V—V in FIG. 4. FIG. 6 is a sectional view taken along line VI—VI in FIG. 4. The transflective liquid crystal display device has a transmissive portion 112 and a reflective portion 113 in each pixel and is provided with a first substrate 101 and a second substrate 102 that are opposed to each other. Alignment films 109 and 110 are formed at innermost positions with respect to the first substrate 101 and the second substrate 102, respectively. A liquid crystal layer 111 is held between the alignment films 109 and 110.

A color filter 103 and a color filter black matrix (hereinafter abbreviated as "black matrix") 104 as a light shield member are formed on the liquid-crystal-111-side major surface 101a of the first substrate 101 in prescribed regions corresponding to each pixel. A transparent electrode 105 and the alignment film 109 are formed on the color filter 103 and the black matrix 104. A quarter-wave plate 114, a half-wave plate 115, and a polarizing plate 116 are laid on the outer major surface 101b of the first substrate 101 to form a circularly polarizing plate 120.

On the other hand, as shown in FIG. 5, a reflective electrode 108 that is a metal film is formed on the liquid crystal-layer-111-side major surface 102a of the second substrate 102 with an organic insulating film 106 and a transparent electrode 107 interposed in between. The opening of the reflective electrode 108 is the transmissive portion 112. As shown in FIG. 6, part of the reflective electrode 108 is formed on an asperity portion of the organic insulating film 106 to serve as the reflective portion 113 having a scattering function.

Incident light is interrupted or transmitted on a pixel-by-pixel basis according to a video signal, that is, a voltage applied between the transparent electrode 105 and the transparent electrode 107/reflective electrode 108. A quarter-wave plate 117, a half-wave plate 118, and a polarizing plate 119 are laid on the outer major surface 102b of the second substrate 102 to form another circularly polarizing plate 121.

The conventional transflective liquid crystal display device having the above configuration has a problem that the display quality is low in the reflective mode in which display is performed on ambient light. This is mainly because leakage light coming from portions other than the reflective portion 113, in particular, slant portions 112a on both sides of the transmissive portion 112, is mixed into reflective light from the reflective portion 113. In a manufacturing process of the liquid crystal display device, the alignment films 109 and 110 are subjected to rubbing treatment to align liquid crystal molecules in a particular direction. However, sufficient rubbing treatment cannot be performed in the vicinities of the slant portions 112a located on both sides of the transmissive portion 112, to cause portions having abnormal liquid crystal alignment. Reflective light and transmissive light from these portions are a factor of lowering the contrast ratio, that is, the display quality, of the liquid crystal display device. Further, the reflective electrode 108 has flat portions 112b on both sides of the transmissive portion 112. The flat portions 112b cause specular reflection in the reflective mode, which results in a problem that the display quality is lowered in the reflective mode.

SUMMARY OF THE INVENTION

The present invention has been made to solve the above problems, and an object of the invention is therefore to provide a transflective liquid crystal display device having high display quality by increasing the contrast ratio in the reflective mode in which display is performed on ambient light.

A liquid crystal display device according to the invention includes a first substrate and a second substrate opposed to each other with a liquid crystal layer interposed in between, and forms a plurality of pixels formed between the first substrate and the second substrate, in which each of the pixels includes a reflective portion for reflecting ambient light according to a video signal and a transmissive portion for transmitting back light source light according to the video signal, the reflecting portion and the transmissive portion are located adjacently to each other in one direction at each of the pixels. The liquid crystal display device further includes a color filter corresponding to each of the pixels and a black matrix as a light shield member that are formed on the second substrate. The black matrix extends in the one direction at each of the pixels and is formed so as to be opposed to side portions located on both sides of the reflective portion and the transmissive portion. Wherein a width of portions of the black matrix that are opposed to the side portions located on both sides of the transmissive portion being greater than a width of portions of the black matrix that are opposed to the side portions located on both sides of the reflective portion.

In the liquid crystal display device according to the invention, the width of the portions of the black matrix that are opposed to the side portions located on both sides of the transmissive portion is set greater than the width of portions of the black matrix that are opposed to the side portions located on both sides of the reflective portion. Therefore, the side portions located on both sides of the transmissive portion are shielded from light by the black matrix over a wider area. This prevents a phenomenon that light coming from both side portions of the transmissive portion is mixed into light from the reflective portion. As a result, the contrast ratio is increased in the reflective mode in which display is performed on ambient light, and a liquid crystal display device having high display quality can be obtained.

DESCRIPTION OF THE PREFERRED EMBODIMENTS

Embodiments of the present invention will be hereinafter described with reference to the drawings.

Embodiment 1

Figure 1:
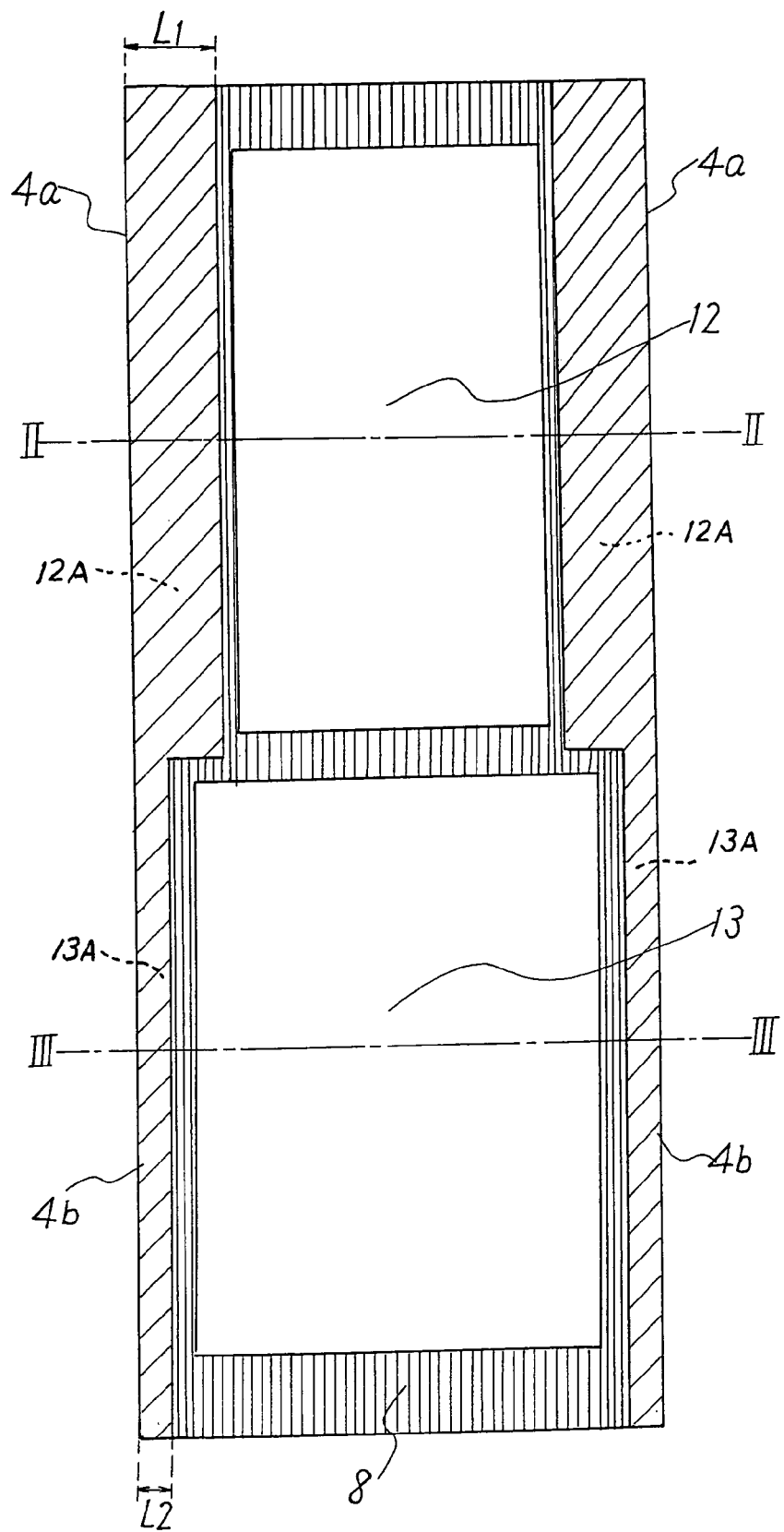
FIG. 1 is a plan view showing one pixel of a liquid crystal display device according to a first embodiment of the present invention.
Figure 2:
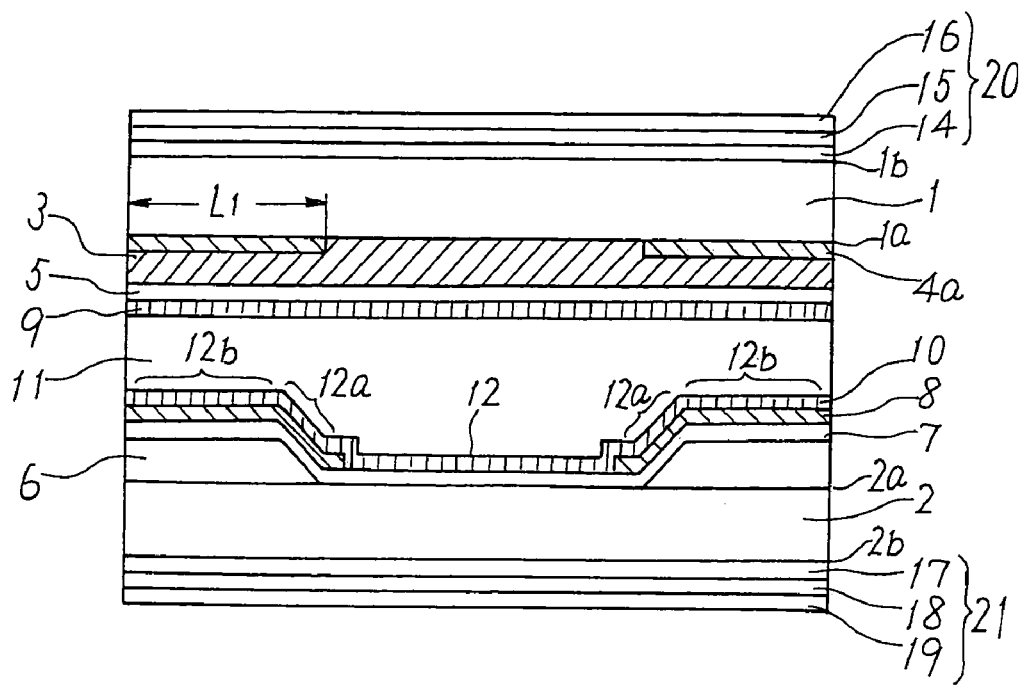
FIG. 2 is a sectional view of the one pixel of the liquid crystal display device taken along line II—II in FIG. 1.
Figure 3:
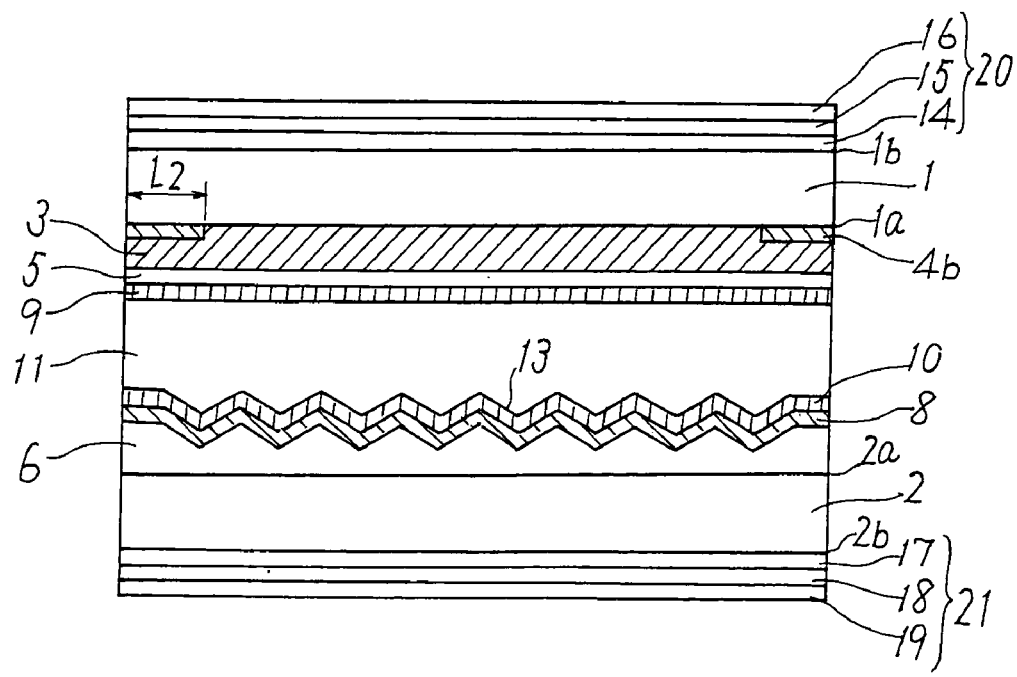
FIG. 3 is a sectional view of the one pixel of the liquid crystal display device taken along line III—III in FIG. 1.
Figure 4:
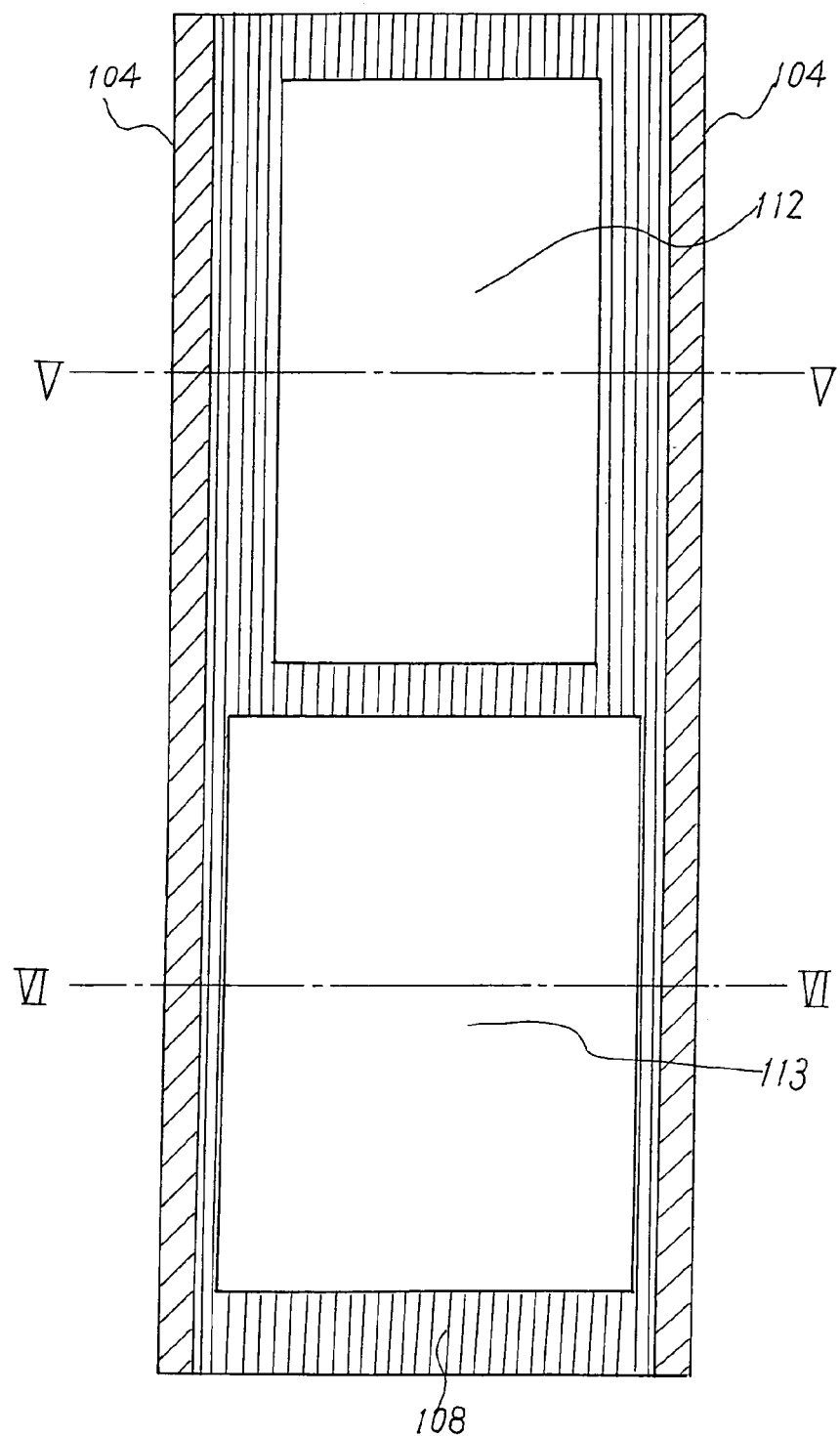
FIG. 4 is a plan view showing one pixel of a conventional tarnsflective liquid crystal display device.
Figure 5:
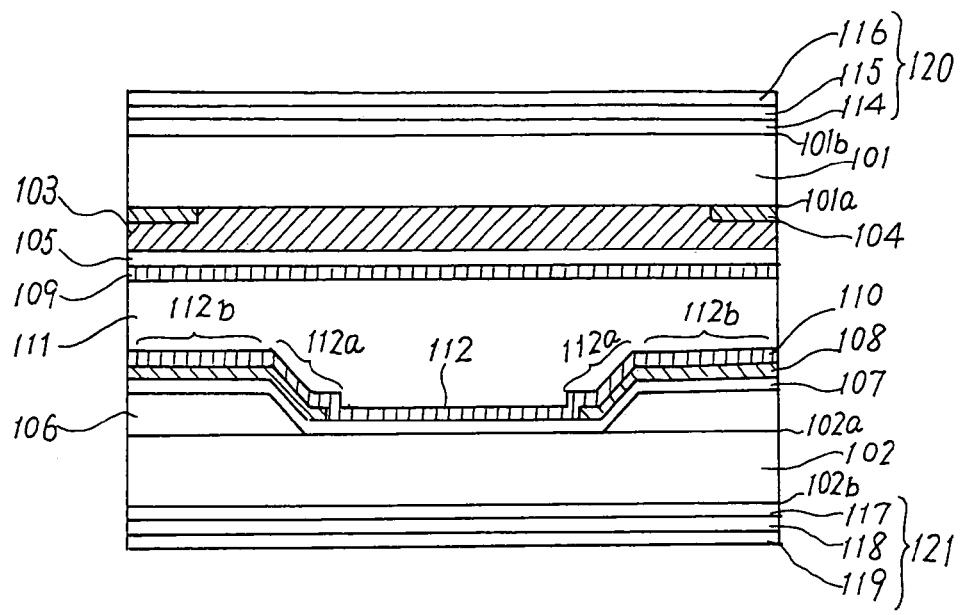
FIG. 5 is a sectional view taken along line V—V in FIG. 4.
Figure 6:
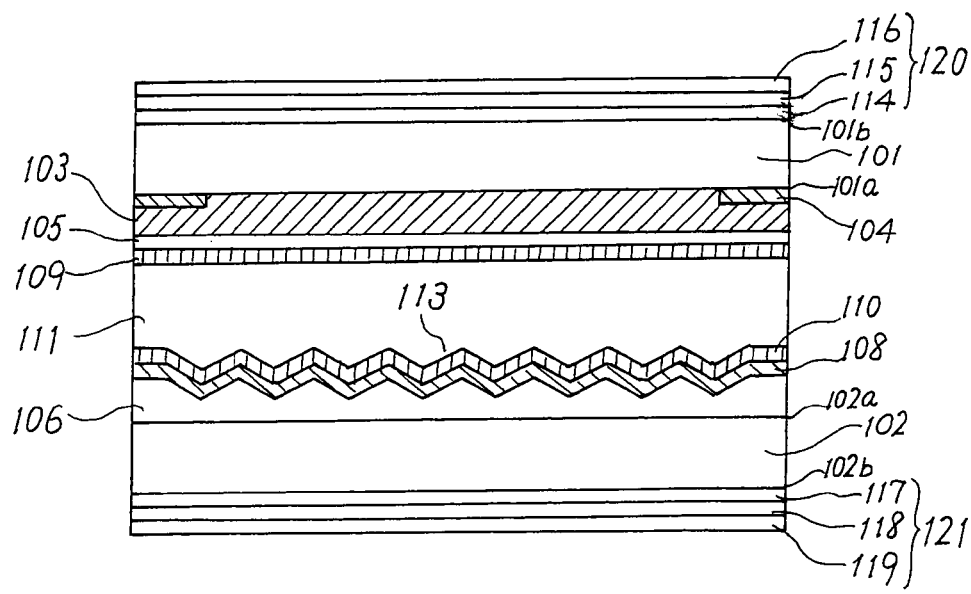
FIG. 6 is a sectional view taken along line VI—VI in FIG. 4.

FIG. 1 is a plan view showing one pixel of a transflective liquid crystal display device according to a first embodiment of the invention. FIG. 2 is a sectional view taken along line II—II in FIG. 1. FIG. 3 is a sectional view taken along line III—III in FIG. 1. As shown in FIG. 1, the transflective liquid crystal display device according to the first embodiment has a transmissive portion 12 and a reflective portion 13 in each pixel. The transmissive portion 12 and the reflective portion 13 both have a rectangular shape and are arranged in the vertical direction in FIG. 1 in such a manner that the transmissive portion 12 is located over the reflective portion 13. The horizontal width of the transmissive portion 12 is smaller than that of the reflective portion 13, and the horizontal width of two side portions 12A on both sides of the transmissive portion 12 is greater than that of two side portions 13A on both sides of the reflective portion 13.

Sectional structures relating to the transmissive portion 12 and the reflective portion 13 will be described below with reference to FIGS. 2 and 3. A first substrate 1 and a second substrate 2 are opposed to each other and a plurality of pixels are formed in between. Alignment films 9 and 10 for aligning liquid crystal molecules in a prescribed direction are formed at innermost positions with respect to the first substrate 1 and the second substrate 2, respectively. A liquid crystal layer 11 is held between the alignment films 9 and 10. In this embodiment, the alignment films 9 and 10 are made of soluble polyimide and the rubbing method is employed as a method for aligning liquid crystal molecules. Thefirst-substrate-1-side structure for the transmissive portion 12 is almost the same as that for the reflective portion 13. A color filter 3 and color filter black matrixes (hereinafter abbreviated as "black matrix") 4a and 4b as a light shield member are formed on the liquid-crystal-11-side major surface 1a of the first substrate 1 in prescribed regions corresponding to each pixel. The black matrixes 4a and 4b extend in the arrangement direction of the transmissive portion 12 and the reflective portion 13, that is, in the vertical direction in FIG. 1. The black matrix 4a is opposed to the side portions 12A located on both sides of the transmissive portion 12, and the black matrix 4b is opposed to the side portions 13A located on both sides of the reflective portion 13. In this embodiment, the width L1 of the portions of the black matrix 4a that are opposed to the respective side portions 12A is greater than the width L2 of the portions of the black matrix 4b that are opposed to the respective side portions 13A by 9 $\mu$m. An ITO transparent electrode 5 is formed on the color filter 3, and the alignment film 9 is formed on the transparent electrode 5.

On the other hand, the second-substrate-2-side structure for the transmissive portion 12 is different from that for the reflective portion 13. As shown in FIG. 2, in the transmissive portion 12, a reflective electrode 8 that is an aluminum (Al) film is formedontheliquid-crystal-layer-11-side major surface 2a of the second substrate 2 with an organic insulating film 6 and an ITO transparent electrode 7 interposed in between. For each pixel, the reflective electrode 8 has an opening that is the transmissive portion 12. Slant portions 12a exist in the respective side portions 12A located on both sides of the transmissive portion 12. Sufficient rubbing treatment cannot be performed in the vicinities of the slant portions 12a, to cause portions having abnormal liquid crystal alignment. Reflective light and transmissive light from the slant portions 12a are a factor of lowering the contrast ratio, that is, the display quality, of the liquid crystal display device. Further, the reflective electrode 8 has flat portions 12b in the respective side portions 12A located on both sides of the transmissive portion 12. The flat portions 12b cause specular reflection in the reflection mode, which lowers the display quality in the reflective mode. In view of the above, in this embodiment, the width L1 of the portions of the black matrix 4a that are opposed to the respective side portions 12A of the transmissive portion 12 is set greater than the width L2 of the portions of the black matrix 4b that are opposed to the respective side portions 13A of the reflective portion 13. This prevents a phenomenon that leakage light coming from the slant portions 12a of the side portions 12A located on both sides of the transmissive portion 12 or specular reflective light coming from the flat portions 12b would otherwise be mixed into reflective light from the reflective portion 13.

As shown in FIG. 3, in the reflective portion 13, part of the organic insulating film 6 is formed with asperities and part of the reflective electrode 8 is formed on the asperity portion of the organic insulating film 6, whereby that surface of the reflective electrode 8 is also given asperities and hence a scattering function. If the reflective electrode 8 were flat, the display image quality would extremely be deteriorated because reflective light from the outermost surface of the liquid crystal display device (in FIG. 3, the top surface of a polarizing plate 16) would be superimposed on reflective light for display that has passed through the liquid crystal layer 11. This is the reason why the part of the underlying organic insulating film 6 is formed with asperities and the part of the reflective electrode 8 is thereby given asperities and hence a light scattering function. The thickness of the liquid crystal layer 11 in the area of the transmissive portion 12 and that in the area of the reflective portion 13 is adjusted by adjusting the thickness of the organic insulating film 6. That is, the transmissive portion 12 and the reflective portion 13 formed on the major surface 2*a* of the second substrate 2 have a level difference, and the liquid crystal layer 11 is thicker in the area of the transmissive portion 12 than in the area of the reflective portion 13. The liquid crystal layer 11 interrupts or transmits incident light on a pixel-by-pixel according to a voltage that is applied between the transparent electrode 5 and the transmissive electrode 7/reflective electrode 8.

A quarter-wave plate 14, a half-wave plate 15, and a polarizing plate 16 (all produced by Nitto Denko Corp.) are laid on the outer major surface 1*b* of the first substrate 1 to form a circularly polarizing plate 20. Similarly, a quarter-wave plate 17, a half-wave plate 18, and a polarizing plate 19 are laid on the outer major surface 2*b* of the second substrate 2 to form another circularly polarizing plate 21. The use of the quarter-wave plates 14 and 17 and the half-wave plates 15 and 18 makes it possible to realize a liquid crystal display device having superior display characteristics including a large contrast ratio in each of the reflective mode and the transmissive mode.

The display quality of the transflective liquid crystal display device according to this embodiment was checked in each of the reflective mode and the transmissive mode. It was found that highly legible, high-quality display without any glare was realized. The contrast ratio (i.e., the ratio of white-display luminance to black-display luminance) was also evaluated. Contrast ratio measurements in the reflective mode were performed by using a Xe lamp and a luminance meter (BM-5A of Topcon Corp.) as a light source and a detector, respectively. Measurements in the transmissive mode were performed by using an evaluation backlight system (Moritex Corp.) as a light source and using the same luminance meter as used in the measurements in the reflective mode. Measurement results were such that the contrast ratio was 74 in the reflective mode and 194 in the transmissive mode. From the viewpoint of legibility, it is preferable that the contrast of a liquid crystal display device be larger than about 10 in the case of a reflective-type device and larger than about 100 in the case of a transmissive type device. That is, in the transflective liquid crystal display device according to this embodiment, high-contrast display was obtained in both of the reflective mode and the transmissive mode.

Embodiment 2

A transflective liquid crystal display device according to a second embodiment of the invention is similar in configuration to the transflective liquid crystal display device according to the first embodiment. Therefore, FIGS. 1–3 will also be used in the following description and individual components will not be described in detail. In this embodiment, the width L1 of the portions of the black matrix 4*a* that are opposed to the respective side portions 12A of the transmissive portion 12 is set greater, by 4 $\mu$m, than the width L2 of the portions of the black matrix 4*b* that are opposed to the respective side portions 13A of the reflective portion 13.

The display quality of the transflective liquid crystal display device according to this embodiment was checked in each of the reflective mode and the transmissive mode. It was found that highly legible, high-quality display without any glare was realized. The contrast ratio was also evaluated by the same evaluation method as in the first embodiment. Measurement results were such that the contrast ratio was 63 in the reflective mode and 184 in the transmissive mode. That is, high-contrast display was obtained in both of the reflective mode and the transmissive mode.

The difference between the width of the portions of the black matrix 4*a* opposed to the side portions 12A of the transmissive portion 12 and the width of the portions of the black matrix 4*b* opposed to the side portions 13A of the reflective portion 13 is set to 9 $\mu$m in the first embodiment and 4 $\mu$m in the second embodiment. However, the invention is not limited to those cases. With regard to the horizontal width of the portions of the black matrix 4*a* opposed to the side portions 12A of the transmissive portion 12, it is desirable that those portions of the black matrix 4*a* not cover the transmissive portion 12 and cover as large parts of the slant portions 12*a* as possible, though the design value depends on the device type. In view of the fact that the first substrate 1 and the second substrate 2 have a registration error of about 4 $\mu$m, it is currently desirable that the difference between the horizontal width of the portions of the black matrix 4*a* opposed to the side portions 12A of the transmissive portion 12 and that of the portions of the black matrix 4*b* opposed to the side portions 13A of the reflective portion 13 be set in a range of 1 to 12 $\mu$m.

As described above, in the transflective liquid crystal display devices according to the first and second embodiments, the horizontal width L1 of the portions of the black matrix 4*a* opposed to the side portions 12A of the transmissive portion 12 is set greater than the horizontal width L2 of the portions of the black matrix 4*b* opposed to the side portions 13A of the reflective portion 13. This measure prevents a phenomenon that leakage light coming from the slant portions 12*a* of the side portions 12A located on both sides of the transmissive portion 12 or specular reflective light coming from the flat portions 12*b* would otherwise be mixed into reflective light from the reflective portion 13, whereby the contrast ratio is increased in the reflective mode in which display is performed on ambient light such as sunlight. As a result, the liquid crystal display devices exhibit high display quality.

As described above, according to the invention, since the width of the portions of the black matrix opposed to the side portions of the transmissive portion is set greater than the width of the portions of the black matrix opposed to the side portions of the reflective portion, a phenomenon can be prevented that leakage light coming from the slant portions located on both sides of the transmissive portion or specular reflective light coming from the flat portions would otherwise be mixed into reflective light from the reflective portion. As a result, the contrast ratio is increased in the reflective mode in which display is performed on ambient light such as sunlight, and a liquid crystal display device having high display quality can be obtained.

What is claimed is:

1. A liquid crystal display device including a first substrate and a second substrate opposed to each other with a liquid crystal layer interposed in between, and forming a plurality of pixels between the first substrate and second substrate, in which each of the pixels includes a reflective portion for reflecting ambient light according to a video signal and a transmissive portion for transmitting back light source light according to the video signal, and the reflective portion and the transmissive portion are located adjacently to each other in one direction at each of the pixels, the liquid crystal display device comprising;

a color filter corresponding to each of the pixels and a black matrix as a light shield member that are formed on the second substrate, the black matrix extending in the one direction at each of the pixels and formed so as to be opposed to side portions located on both sides of the reflective portion and the transmissive portion, wherein a width of portions of the black matrix that are opposed to the side portions located on both sides of the transmissive portion being greater than a width of portions of the black matrix that are opposed to the side portions located on both sides of the reflective portion.

2. The liquid crystal display device according to claim 1, wherein a difference between the width of the portions of the black matrix that are opposed to the side portions located on both sides of the transmissive portion and the width of the portions of the black matrix that are opposed to the side portions located on both sides of the reflective portion is in a range of 1 to 12 $\mu$m.

3. The liquid crystal display device according to claim 1, wherein the liquid crystal layer is made of a liquid crystal material having positive dielectric constant anisotropy, and wherein a quarter-wave plate, a half-wave plate, and a polarizing plate are disposed on an outer surface of each of the first substrate and the second substrate.

4. The liquid crystal display device according to claim 1, wherein the reflective portion has an asperity structure and hence is light-diffusive.

* * * * *